July 24, 1923.

F. H. BOWMAN 1,463,004

ELECTRICAL RECORDING INSTRUMENT

Filed Dec. 22, 1920

3 Sheets-Sheet 1

Inventor:
Francis H. Bowman,
by Albert G. Davis
His Attorney.

July 24, 1923.

F. H. BOWMAN 1,463,004

ELECTRICAL RECORDING INSTRUMENT

Filed Dec. 22, 1920

3 Sheets-Sheet 2

Inventor:
Francis H. Bowman,
by Albert G. Davis
His Attorney.

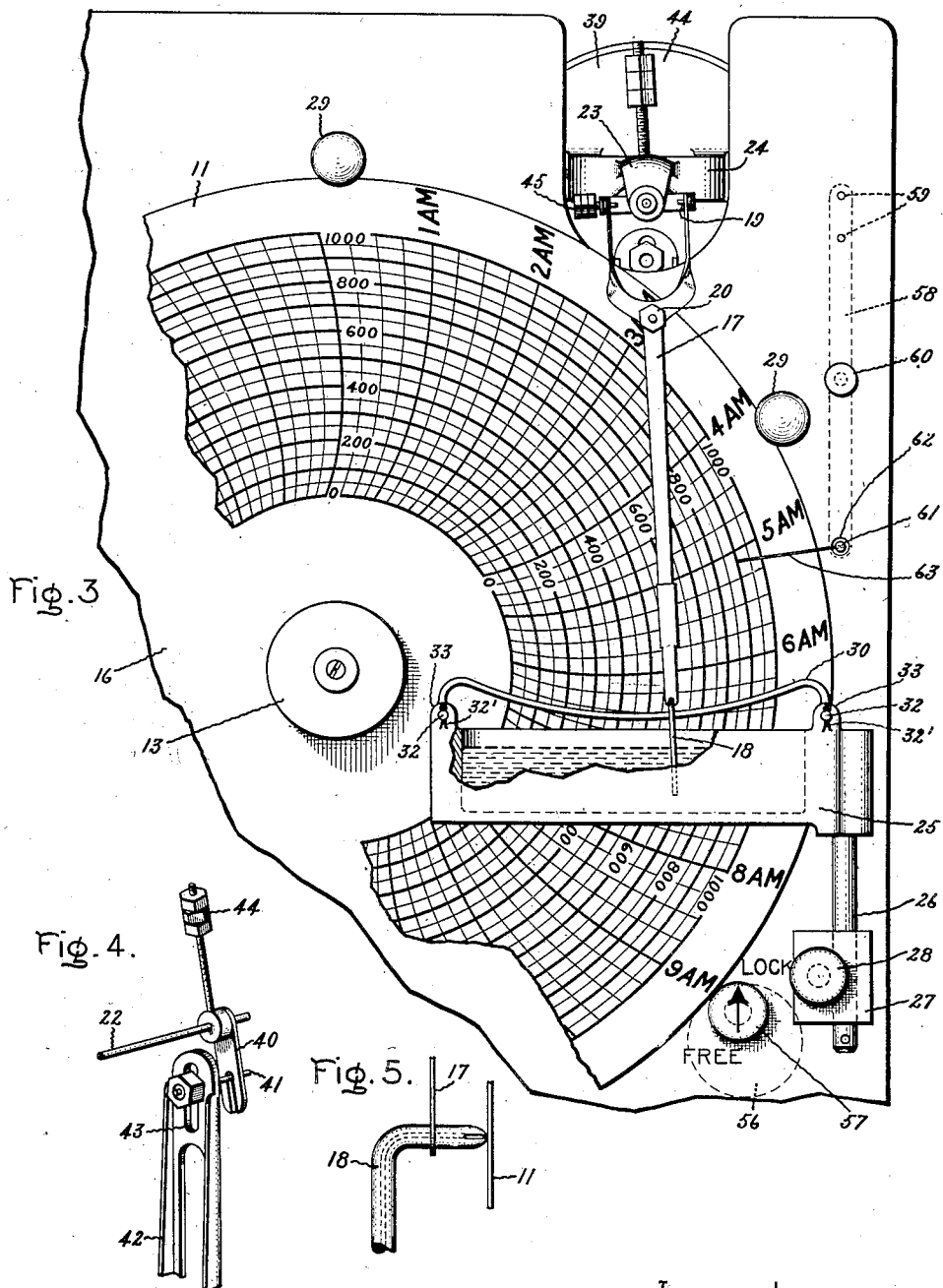

Patented July 24, 1923.

1,463,004

UNITED STATES PATENT OFFICE.

FRANCIS H. BOWMAN, OF LYNN, MASSACHUSETTS, ASSIGNOR TO GENERAL ELECTRIC COMPANY, A CORPORATION OF NEW YORK.

ELECTRICAL RECORDING INSTRUMENT.

Application filed December 22, 1920. Serial No. 432,426.

*To all whom it may concern:*

Be it known that I, FRANCIS H. BOWMAN, a citizen of the United States, residing at Lynn, county of Essex, State of Massachusetts, have invented certain new and useful Improvements in Electrical Recording Instruments, of which the following is a specification.

My invention relates to recording instruments and more particularly to instruments adapted to measure an electrical quantity, such as the power expended in an electrical circuit.

The invention has particular utility in connection with a graphic instrument adapted to trace the variations of the quantity being measured in the form of a curve.

One object of the invention is to provide an extremely compact and accurate instrument of the type indicated. Another object is to make it safe for such an instrument to be transported without danger of injuring the delicate moving parts thereof. The invention further resides in various modifications and improvements in recording instruments to be hereinafter more fully described and claimed.

Figure 1:
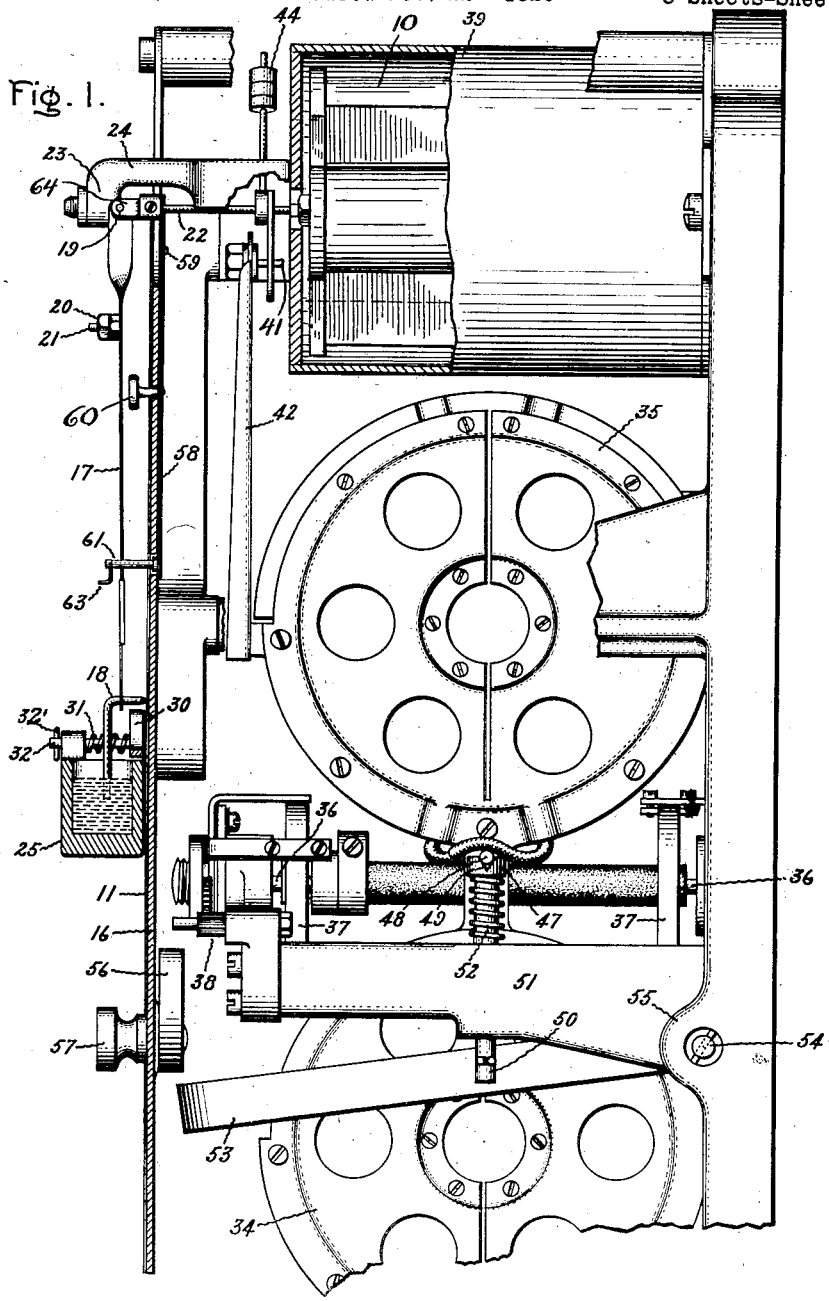
Figures 2, 6:
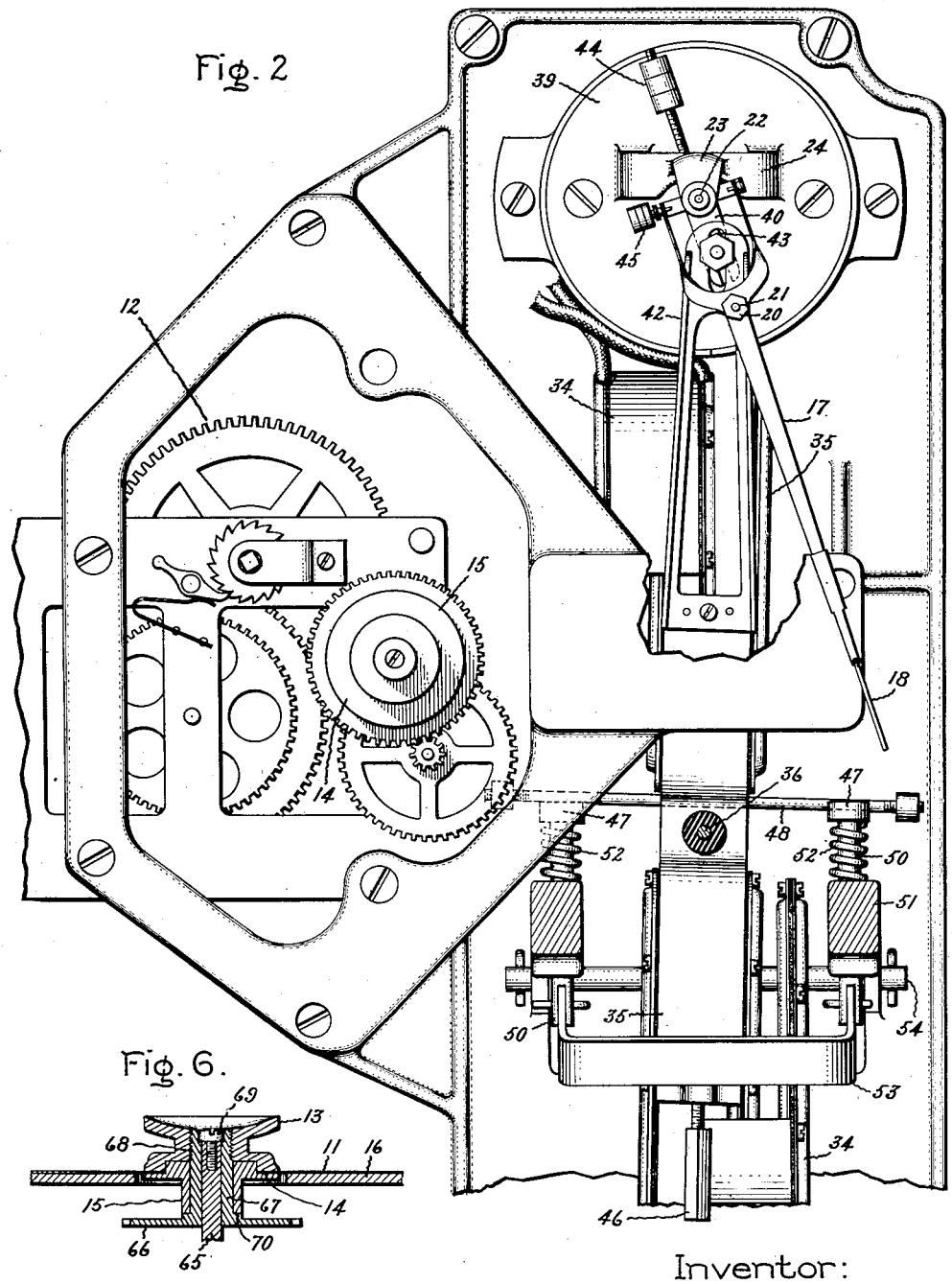

For a better understanding of the construction and mode of operation of the invention, reference is to be had to the following description taken in connection with the accompanying drawings, in which Fig. 1 is a side view partially in section, showing the main features of the instrument and omitting the cover; Fig. 2 is a front view of the instrument with the front plate removed so as to show more clearly the operating elements of the instrument; Fig. 3 is a fragmentary front view, showing more clearly the relation between the stylus and the record chart; Fig. 4 is a perspective view of a detail in the construction showing how movement is transmitted from the movable element of the instrument to the recording stylus; Fig. 5 is an enlarged fractional view showing the scribing point of the stylus; and Fig. 6 is a partial sectional view showing the means for driving the record chart.

Referring now more in detail to the drawings, in which like reference characters refer to like parts throughout, in the present instance the invention is shown applied to a graphic watt meter of the Thomson balance type. The record chart 11 shown in Fig. 3 is adapted to be rotated at a constant speed so that the power expended may be read as a function of the time. For the purpose of rotating the record chart at a uniform rate a conventional type of clock mechanism shown at 12 on Fig. 2 is employed. The record chart 11 is mechanically connected to the driving shaft of the clock mechanism by means of a thumb nut 13 which clamps the record sheet 11 between its lower surface and the surface 14 on the member or bushing 15 connected to the driving spindle of the clock work 12, shown in Figs. 2 and 6. This member 15 projects through a suitable aperture of the front plate 16 of the instrument, the surface 14 being flush with that of the plate 16. Fig. 6 shows most clearly the clock movement spindle 65, driven by the last gear member 66 of the clock train, supporting this gear member and the member 15. The gear member 66 has a tubular portion 67 which fits over the spindle 65 and which carries an external screw thread at 68 for the reception of the thumb nut 13. The screw 69 serves to fasten the gear wheel member 66 to the end of the spindle 65 which is appropriately tapped. Upon the tubular portion 67 there is disposed the member 15, which, when the thumb nut 13 is tightened, is held securely against the shoulder 70 of the gear wheel member 66.

Cooperating with the record chart 11 is the pen 17 carrying the stylus 18. This pen 17 is formed of resilient material and is pivoted for movement in the plane parallel to the surface of the record chart 11 at the point 64. To cause the scribing point of the stylus 18 to engage the surface of the record chart 11 with a slight and uniform pressure, a pivotal connection 19 is employed which allows the pen 17 to be swung in a plane perpendicular to the plane of the record chart. This connection also serves to allow the stylus 18 to be swung out of operative engagement when the record chart 11 is to be renewed. To assist in holding the stylus up against the sheet with the correct pressure, it may be advisable to employ counterweights, such as the nuts 20 supported on a short stud 21 connected to the resilient material forming the pen 17. The shaft 22 forming the pivot point 64 and to which is connected the pen 17 is appropriately pivoted at one end in the boss 23 forming a part of a casting 24, forming a portion of the stationary elements of the instrument. The pivot at the other end of the shaft 22 is hidden by the member 39 into which the shaft extends. A novel means is employed for supplying ink to the stylus. It is possible by the use of this novel means to make the movable pen extremely light, since no ink at all need be carried by it. The stylus merely dips into a stationary well arranged so as to supply the stylus continually with the writing fluid. For this purpose the stylus 18 is formed from a metallic tube having a capillary aperture thereto and bent at an angle, as clearly shown in Figs. 1 and 5. In the present instance the angle formed by the capillary tube is a right angle. The extremity of the stylus 18 which forms a scribing point is slotted, as clearly shown in Fig. 5, and is flattened slightly in a direction parallel to the slot. It has been found that such a construction allows an even flow of the ink and is preferable to an unslotted construction, since a thinner line may be traced. The other extremity of the stylus 18 dips into an inkwell 25 which is adjustably supported in a vertical direction by appropriate means such as the rod 26 joined to the inkwell 25 and the stationary clamp 27 within which the rod 26 slides and which may be tightened by means of a thumb nut 28. By means of this construction it is not only possible to adjust the inkwell in a vertical position, but it is also possible to swing it in a horizontal plane at right angles to the plane of the chart 11, so as to permit of the removal of this chart. As the stylus 18 swings about the center of shaft 22, it is evident that the ink is carried by capillary attraction from the well 25 to the scribing points of the stylus.

In order to prevent the chart 11 from leaving its flat position upon the front plate 16 of the instrument, knobs or buttons 29 are provided of sufficient number upon the front plate 16, to guide the record chart 11. Furthermore, a bar 30 supported on the inkwell 25 and curved as shown is so arranged that it presses resiliently upon the record chart 11 when the inkwell 25 is in an operative position. The means for resiliently pressing this bar 30 is clearly shown in Fig. 1 and comprises the compression springs 31, encircling the rods 32, serving as supports for the bar 30 at its extremities. These rods 32 pass loosely through apertures in lugs 33 appropriately formed on the inkwell 25 and are prevented when the inkwell 25 is moved into its inoperative position from disengagement with the lugs 33 by means of the small pins 32' passing through the rods 32.

As stated heretofore, the present embodiment of the invention comprises an electrical watt meter. For the purpose of showing more clearly how the invention may be embodied in such an instrument a stationary element 34 is shown comprising a plurality of flat coils. A pivoted shaft 36 serves as a common support for all of the coils making up the movable element 35, while the coils forming the stationary element are appropriately supported from the frame work of the instrument. The stationary and movable elements as described may be readily recognized as comprising an instrument known as the Thomson balance, and since such an instrument is well known, further description of the operation and theory of it is considered unnecessary.

For controlling the movement of the movable element 35 suitable control springs 37 are employed whereby the relative position of the stationary and movable elements is determined by the quantity measured. These control springs comprise spirally wound strips of resilient material, the inner ends of which connect to the shaft 36 while the outer ends are connected to stationary parts of the mechanism. Appropriate means, such as shown at 38, may also be used for varying the tension of these control springs for calibrating or adjusting the instrument. It is evident that these control springs by means of their torques which oppose the movement of the movable element 35 cause said movable element to take up a position dependent upon how much torque is exerted between the stationary and movable elements.

The instrument is adapted to record by means of the elements hereinbefore described the positions which the movable element takes up as a function of the time. For this purpose a mechanical connection is employed between the movable element 35 and the stylus 18. While ordinarily the control springs in such a type of instrument act directly upon the recording pen 17, the present invention improves such a construction by arranging the control springs so that they act directly upon the movable element instead of through intermediary mechanical connections. This leads to a much more satisfactory mechanical construction. The mechanical connections in this case are also employed to connect the movable element with an appropriate damping device, such as is shown for example in U. S. Patent No. 1,269,519, issued June 11, 1918, and reissued Nov. 5, 1918, No. 14,545. Thus the shaft 22 which supports the pen 17 and stylus 18 also carries within the cylinder 39 the movable vane member 10 of the air damping device. However, any other appropriate damping means may be utilized to prevent jerky motion of the pen over the chart. The mechanical connection between the movable element 35 and the shaft 22 comprises a slot and pin connection shown in greater detail in Fig. 4. In this figure a slotted lever 40 is shown, rigidly connected to the shaft 22, with which a pin 41 is adapted to coact. This pin is adjustably connected to the member 42, connected to the movable element as clearly shown in Fig. 1. The adjustment of pin 41 in this case is effected by means of a slot 43 formed in the member 42. In this way the throw of the pen 17 may be adjusted. It is to be noted that the various movable elements of the instrument may be carefully balanced by means of the counterweights 44, 45 and 46, all carried by or mechanically connected in some way or another with the movable element 35.

When the instrument is to be laid away without use for a considerable length of time, or when it is to be shipped, it is extremely desirable that the delicate movable elements be held locked. The means for locking the movable element comprise a pair of spring pressed blocks 47 adapted to restrain the movement of a rod 48 mechanically connected with the movable element 35 and having its axis perpendicular to the axis of the pivoted shaft 36. The blocks 47 have V-shaped notches 49 cut in them for the reception of the rod 48 when these blocks 47 engage the rod. These blocks 47 have a shank 50 loosely mounted in the arm 51 of the stationary framework of the instrument. The springs 52 serve to urge the blocks 47 up against the rod 48. It is evident that while springs 52 are not restrained from acting upon blocks 47, these blocks 47 will prevent effectually the rotation of the movable element 35. In order to permit this movable element to operate manually operable means are provided for withdrawing the blocks 47 from the rod 48 against the pressure of the springs 52. For this purpose a frame 53 is supplied pivoted at 54 in a boss 55 integral with the stationary casting forming the main support of the instrument. This frame is shown as a U-shaped member to which are mechanically connected the shanks 50 of the blocks 47, which shanks pass through the arm 51. The shanks 50 are appropriately provided with slots, as clearly shown in Fig. 2 for the reception of the sides of the frame 53. It is evident that by rotating the frame 53 in a counter clockwise direction, as viewed in Fig. 1, the springs 52 are compressed while the blocks 47 move out of engagement with the rod 48, and the movable element of the instrument is free to swing. For performing the function of rotating the frame 53 and thus permitting operation of the instrument a manually operable cam 56 is provided. A thumb button 57 connected with the cam 56 is made use of to rotate this cam, supported in the front plate 16. Appropriate markings are placed upon this front plate, as shown in Fig. 3, to indicate when the movable element is free and when it is locked. In the positions shown, the pointer on the knob 57 shows that the instrument is locked. To release the instrument it is necessary to turn this knob manually until the arrow points to the word "Free". When this is done, the cam swings down and rotates the frame 53 sufficiently to free the rod 48 and to leave it unrestrained for the normal operation of the instrument. By leaving the frame 53 depressed, the instrument is left in its operative position.

Approximate means are provided for holding the stylus 18 out of operative engagement with the record chart 11, while the instrument is inoperative. This means comprises a flat spring 58 secured at the back of the front plate 16, as by means of rivets 59. This flat spring 58 may be flexed manually by means of a button 60 extending through the front plate 16, and carried by the spring 58. At its lower extremity the flat spring 58 carries a post 61 projecting through an aperture 62 at the front plate. This post 61 carries a wire 63 which may be made to engage with the pen 17 by depressing the button 60 and allowing the pen 17 to move directly over the wire 63 and then releasing the button 60. In normal operation the pen 17 passes underneath the wire 63, as is clearly indicated in Fig. 1.

While I have shown in the accompanying drawings but one embodiment of my invention, I do not wish to be limited thereto but aim to cover in the appended claims all modifications falling fairly within the scope of my invention.

What I claim as new and desire to secure by Letters Patent of the United States, is,—

1. In a recording instrument, a vertically disposed disc type record chart, a capillary tube bent into a right angle, forming a stylus, a well for holding ink, one of the legs of said capillary tube being adapted to dip within the well, means for moving the capillary tube in accordance with the quantity being measured, and an adjustable hinged support for said well whereby its vertical position is rendered adjustable, and whereby it may be swung in a horizontal plane away from the record chart to facilitate the removal of the latter.

2. In a recording instrument, a rotating record chart, a capillary tube forming a stylus, a well for holding ink, means for moving the capillary tube relative to the chart in response to the quantity being measured, one extremity of the tube forming the scribing point, and the other extremity being adapted to dip within the well, an adjustable support for said well for permitting said well to be adjusted vertically as well as rotated in a plane at right angles to the plane of the moving chart whereby the chart may be readily removed and replaced, and a bar resiliently supported on said well adapted to assist in keeping the chart flat while said well is in its operative position.

3. In an electrical recording instrument, a plurality of flat coils forming the stationary element of the instrument, a plurality of movable coils coacting therewith, a pivoted shaft serving as a common support for the movable coils, control springs each having one end fastened to a stationary part of the instrument, and the other end to the pivoted shaft, a damping device including a rotatable member, a mechanical connection between the movable coils and said rotatable member, a recording stylus carried by said rotatable member, and a chart cooperating with said stylus.

4. In an electrical recording instrument, a stationary element, a movable element, a recording stylus, a rotatable shaft supporting said stylus, a connection comprising a slot and a pin freely movable in said slot between the movable element and said shaft whereby said shaft is rotated in response to the movement of said movable element, and means for adjusting said slot-and-pin connection for varying the ratio of motion between said shaft and said movable element.

5. In an electrical recording instrument, a plurality of stationary coils, a movable element cooperating therewith, comprising a plurality of movable coils, a pivoted shaft supporting said movable coils, a stylus, a record sheet cooperating therewith, a rotatable shaft supporting said stylus, a slotted lever carried by said shaft, and a pin cooperating with the slot in said lever, adjustably connected to the movable element.

6. In an electrical recording instrument having a stationary element and a rotatable element, a manually operable cam, and means for locking the movable element comprising a rod having its axis at an angle with the axis of rotation of the rotatable element, a pair of spring pressed block cooperating with the ends of said rod to restrain its movement, and a common movable support for said blocks, said manually operable cam being adapted to move said movable support to free the rod.

7. In an electrical recording instrument, a stationary element, a movable element cooperating with the stationary element, a pivoted shaft forming a support for the movable element, a rod carried by said shaft having its axis at right angles to the axis of rotation of the shaft, a pair of spring pressed blocks arranged to coact with the ends of said rod, and thus to prevent rotation of the shaft, a pivoted frame to which said blocks are connected, and means for manually rotating the frame to free said pivoted shaft.

In witness whereof, I have hereunto set my hand this 17th day of December, 1920.

FRANCIS H. BOWMAN.